(12) United States Patent
Wiese

(10) Patent No.: US 11,071,282 B2
(45) Date of Patent: Jul. 27, 2021

(54) ANIMAL HARNESS AND RELATED METHODS OF HANDLING AN ANIMAL

(71) Applicant: Eric Wiese, Sherman Oaks, CA (US)

(72) Inventor: Eric Wiese, Sherman Oaks, CA (US)

(*) Notice: Subject to any disclaimer, the term of this patent is extended or adjusted under 35 U.S.C. 154(b) by 294 days.

(21) Appl. No.: 16/389,740

(22) Filed: Apr. 19, 2019

(65) Prior Publication Data

US 2020/0329675 A1    Oct. 22, 2020

(51) Int. Cl.
   *A01K 27/00*    (2006.01)

(52) U.S. Cl.
   CPC .......... *A01K 27/002* (2013.01); *A01K 27/005* (2013.01)

(58) Field of Classification Search
   CPC .... A01K 27/002; A01K 27/00; A01K 27/005; A01K 27/003
   See application file for complete search history.

(56) References Cited

U.S. PATENT DOCUMENTS

| | | | |
|---|---|---|---|
| 5,167,203 A * | 12/1992 | Scott | A01K 1/0263 |
| | | | 119/771 |
| 6,463,888 B2 | 10/2002 | Clark | |
| D511,596 S | 11/2005 | Mugford | |
| 7,107,939 B2 | 9/2006 | Lady | |
| 7,891,322 B2 * | 2/2011 | Bennett | A01K 27/002 |
| | | | 119/856 |
| 7,963,255 B2 * | 6/2011 | Horgan | A01K 27/002 |
| | | | 119/792 |
| D645,213 S | 9/2011 | Silverman | |
| 9,089,110 B2 * | 7/2015 | Lai | A01K 27/002 |
| 9,247,716 B2 * | 2/2016 | Wilson | A01K 27/002 |
| 9,491,931 B2 * | 11/2016 | Yamin | A01K 27/002 |
| 9,609,850 B2 * | 4/2017 | Lajoie | A01K 27/005 |
| 9,655,344 B1 | 5/2017 | Sebö | |
| 2006/0102102 A1 * | 5/2006 | Bennett | A01K 27/005 |
| | | | 119/792 |
| 2010/0122667 A1 * | 5/2010 | Horgan | A01K 27/002 |
| | | | 119/792 |
| 2014/0245970 A1 * | 9/2014 | Wilson | A01K 27/002 |
| | | | 119/864 |
| 2015/0164049 A1 * | 6/2015 | Lai | A01K 27/002 |
| | | | 119/792 |
| 2017/0196200 A1 * | 7/2017 | Wilson | A01K 15/02 |
| 2017/0280685 A1 * | 10/2017 | McCain | A01K 27/002 |
| 2020/0288675 A1 * | 9/2020 | Auld | A01K 27/002 |
| 2020/0375151 A1 * | 12/2020 | Connolly | A01K 27/005 |

* cited by examiner

*Primary Examiner* — Kristen C Hayes

(57) ABSTRACT

A device and method for handling an animal comprising an animal harness. The animal harness comprises a girth strap further comprising a leash attachment point, a fixed chest strap coupled to opposite lateral regions of the girth strap, first and second attachment rings, and a free moving chest strap removably coupled, at both ends, to the attachment rings via releasable connectors. The animal harness may further comprise a midline strap coupled to the girth strap and the fixed chest strap. The straps may further comprise an adjustable slide buckle. The girth strap and the fixed chest strap may further comprise a releasable buckle.

20 Claims, 9 Drawing Sheets

ANIMAL HARNESS AND RELATED METHODS OF HANDLING AN ANIMAL

BACKGROUND

1. Field of the Invention

The inventions described herein generally pertain to animal harnesses used to handle an animal. More particularly, the inventions described herein pertain to animal harnesses designed to safely compel a quadrupedal animal to obey directional cues delivered from a human to the animal through a free-moving strap across the chest of the animal.

2. Description of Related Art

Standard designs for animal harnesses serve as alternative leash attachment points to traditional collars when walking an animal. This standard design usually comprises a strap that is placed around the girth of the animal and a strap that is placed across the chest of an animal, connecting to the girth strap. Additionally, this standard design disperses pressure caused by a leash properly throughout the animal's body when compared to traditional collars. This dispersing of pressure helps prevent injury to the animal. Finally, this standard design provides a human walking an animal to have increased influenced over the forward movement of animal. This increased influence helps prevent injury to the human walking the animal. However, this standard design for animal harnesses does not allow a human walking an animal to compel lateral directional changes with ease, or without risk of injury to his- or herself or the animal.

Some designs for harnesses offer additional leash attachment points that seek to provide a human walking an animal with more influence over the animal's movement. The most common of these designs include fixed leash attachment points on the portions of the harness at the dorsal aspect and chest of the animal. However, this design does not provide a human walking an animal with sufficient influence over the animal's center of gravity. Instead, the human only has influence over the left or right side of the animal's body. This method of increased influence sacrifices proper distribution of pressure, which can cause a multitude of injuries to an animal including ankle injuries, bicep impingement, and improper muscle development.

Other designs of animal harnesses with multiple leash attachment points seek to provide a human walking an animal with influence over the animal's center of gravity while properly distributing the pressure of the harness. These designs most commonly have leash attachment points on opposite lateral aspects of the harness. However, these designs sacrifice the human's ability to compel lateral changes in and animal's direction.

To reduce the complexity and length of this specification, the materials identified in the following paragraphs of this section are herein expressly incorporated by reference in their entirety. The incorporated material is believed to be non-essential in accordance with 37 CFR 1.57 because it is referred to for purposes of providing general support, background, or information relating to the inventions. However, if any such material is deemed essential under Rule 1.57, any such text will be expressly added herein pursuant to the applicable rules.

U.S. Pat. No. 6,463,888 of Clark describes an adjustable animal harness comprising a girth strap, a chest strap, and a single leash attachment point on the dorsal aspect of the girth strap.

U.S. Pat. No. 7,107,939 of Lady describes an adjustable animal harness comprising a girth strap, a chest strap, and a single leash attachment point on the chest strap.

U.S. Pat. No. D511,596 of Mugford describes a design for an animal harness comprising a girth strap, a chest strap, a leash attachment point on the dorsal aspect of the girth strap, and a leash attachment point on the chest strap.

U.S. Pat. No. 9,655,344 of Sebő describes an animal harness comprising a girth strap, a chest strap, dorsal, chest, and lateral attachment points, and a pressure distributing system.

U.S. Pat. No. 9,247,716 of Wilson et al. describes an animal harness comprising a girth strap and a chest strap further comprising a linker and two leash attachment points.

U.S. Pat. No. D645,213 of Silverman describes a chain collar for training dogs.

U.S. Pat. No. 7,963,255 or Horgan describes a dog harness for handling the motion of a medium to large sized dog comprising two girth straps, a chest strap, and two straps connecting the girth straps on the lateral aspect of the dog, wherein each lateral strap further comprises a leash attachment point.

U.S. Pat. No. 9,491,931 of Yamin describes an animal harness with a girth strap and two free-moving chest straps connected to opposite points on the girth strap, wherein each chest strap further comprises a leash attachment point.

SUMMARY

The present invention provides among other things an animal harness and related methods for handling an animal. In an exemplary embodiment, an animal harness has a girth strap, a fixed chest strap, attachment rings, and a free-moving chest strap. The girth strap is configured to be placed around the girth of an animal and has a leash attachment point. The animal harness is configured to be placed across the chest of an animal. The fixed chest strap is coupled at each end to opposite lateral regions of the girth strap. The attachment rings are coupled to opposite lateral regions of the girth strap. The free-moving chest strap is configured to be placed across the chest of an animal. The free-moving chest strap has a releasable connector on either end that may be removably coupled to the attachment rings.

In another non-limiting embodiment, an animal harness has midline strap configured to be placed about the ventral midline of an animal between the girth strap and the fixed chest strap. The midline strap is coupled, at one end, to the girth strap and, at another end, to the fixed chest strap.

In another non-limiting embodiment, an animal harness has a loop coupled to the fixed chest strap through which the free-moving chest strap passes.

In another non-limiting embodiment, the leash attachment point is positioned between and substantially equidistant from the lateral regions of the girth strap.

In another non-limiting embodiment, the girth strap, the fixed chest strap, and/or the free moving chest strap has an adjustable slide buckle.

In another non-limiting embodiment, the midline strap has an adjustable slide buckle.

In another non-limiting embodiment, the fixed chest strap has at least one releasable buckle.

In another non-limiting embodiment, the girth strap has at least one releasable buckle.

In an exemplary process, a method for handling an animal includes placing a girth strap of an animal harness, with leash attachment point, around a girth of the animal. The method also includes placing a fixed chest strap of the animal harness, which is coupled to substantially opposite lateral regions of the girth strap, across the chest of the animal. The method also includes placing a free-moving chest strap of the animal harness, which has releasable connectors at both ends, across the chest of the animal. The method also includes removable coupling the releasable connectors to attachment rings.

Another non-limiting method for handling an animal including placing a midline strap of an animal harness, which is coupled to the girth strap and the fixed chest strap, along a ventral midline of an animal. The method also includes placing the front appendages of the animal in opposite openings created by the midline strap, girth strap, and the fixed chest strap.

Another non-limiting method for handling an animal includes passing the free-moving chest strap through a loop coupled to the fixed chest strap.

Another non-limiting method for handling an animal includes removably coupling the first end of the leash to the leash attachment point. The method also includes removably coupling the releasable connector of the first end of the free-moving chest strap to the second end of the leash. The method also includes removably coupling the releasable connector of the second end of the free-moving chest strap to the second attachment ring.

Another non-limiting method for handling an animal includes coupling the first end of the leash to the leash attachment point. The method also includes removably coupling the releasable connector of the second end of the free-moving chest strap to the second end of the leash. The method also includes removably coupling the releasable connector of the first end of the free-moving chest strap to the first attachment ring.

Another non-limiting method for handling an animal includes adjusting the length of the girth strap using an adjustable slide buckle.

Another non-limiting method for handling an animal includes adjusting the length of the midline strap using an adjustable slide buckle.

Another non-limiting method for handling an animal includes adjusting the length of the fixed chest strap using an adjustable slide buckle.

Another non-limiting method for handling an animal includes adjusting the length of the free-moving strap using an adjustable slide buckle.

Another non-limiting method for handling an animal includes releasing and re-buckling a releasable buckle of the fixed chest strap.

Another non-limiting method for handling an animal includes releasing and re-buckling a releasable buckle of the girth strap.

Aspects and applications of the invention presented here are described below in the drawings and detailed description of the invention. Unless specifically noted, words and phrases in this specification and the claims are to be given their plain and ordinary English meaning. Thus, except where this specification uses the exact phrase "[word or phrase] is hereby defined to mean [definition]," the inventor expressly elects, as his own lexicographer, to use the plain and ordinary meaning of words in the specification and claims rather than a special definition. Absent such specific statement to apply a special definition, the plain and ordinary meaning applies to the terms used in the specification and claims.

The inventor is also aware of the normal precepts of English grammar. Thus, if a noun, term, or phrase is intended to be characterized, specified, limited, broadened, modified or narrowed in some way, the such noun, term, or phrase will expressly include any desired or intended adjectives, descriptive terms, or other modifiers in accordance with the normal precepts of English grammar. Absent the use of such adjectives, descriptive terms, or modifiers in the claim language, it is intended that such nouns, terms, or phrases be given their plain and ordinary English meaning in the field.

Further, the inventor is aware of the availability and limits of functional claiming under 35 U.S.C. § 112(f). As used herein or in the claims, the words "function," "means" or "step" do not indicate an intent to invoke the special provisions 35 U.S.C. § 112(f) to define the inventions. To the contrary, if the provisions of 35 U.S.C. § 112(f) are sought to be invoked to define the inventions, the claims will specifically and expressly recite the exact phrase "means for" and will also expressly recite the word "function" followed by a description of the function (i.e., will state: "means for performing the function of [insert function]"), without also reciting in such phrases any structure, material or act in support of the function. Thus, even if a claim recites a "means for performing the function of . . . " if a claim also recites any supporting structure, material or acts then it is the clear intention of the inventor not to invoke the provisions of 35 U.S.C. § 112(f). If the provisions of 35 U.S.C. § 112(f) are invoked to define the claimed inventions (using the technique defined above), it is intended that the inventions not be limited only to the specific structure, material or acts that are described in any specific embodiment, but in addition, include any equivalent structures, materials, or acts that perform the claimed function, or any structures, materials, or acts described in any alternative situations or forms of the inventions, or that are within the appropriate limits of claim scope and construction and that are reasonably described and reasonably enabled by this specification.

The inventions described in this specification and recited in the claims are not directed to laws of nature, natural phenomena, or abstract ideas, but instead, are directed to one or more of the expressly permitted statutory categories of inventions, i.e., processes, machines, manufactures, or compositions of matter. Nor are the inventions claimed herein directed to any prohibited examples of abstract ideas such as fundamental economic practices, methods of organizing human activity, an idea itself, or any mathematical relationships/formulas. To be clear, the claimed inventions are directed to significantly more than any abstract idea by itself.

BRIEF DESCRIPTION OF THE DRAWINGS

A more complete understanding of the present invention may be derived by referring to the DETAILED DESCRIPTION when considered in connection with the figures. In the figures, like reference numbers refer to like elements or acts. While the figures provide several examples of aspects, elements, modifications, or components that may or may not be variously involved with the systems, methods, and devices described herein, the figures are not provided to define, limit, or affect the scope of the inventions claimed or described herein.

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. However, it will be understood by those skilled in the relevant arts that the present invention may be practiced without these specific details. In other instances, known structures and devices are discussed more generally in order to avoid obscuring the invention. In many cases, a description of the operation is sufficient to enable one to implement the various forms of the invention. It should be noted that there are many different and alternative configurations, devices, and technologies to which the disclosed inventions may be applied. The full scope of the inventions is not limited to the examples that are described below.

Figure 1:
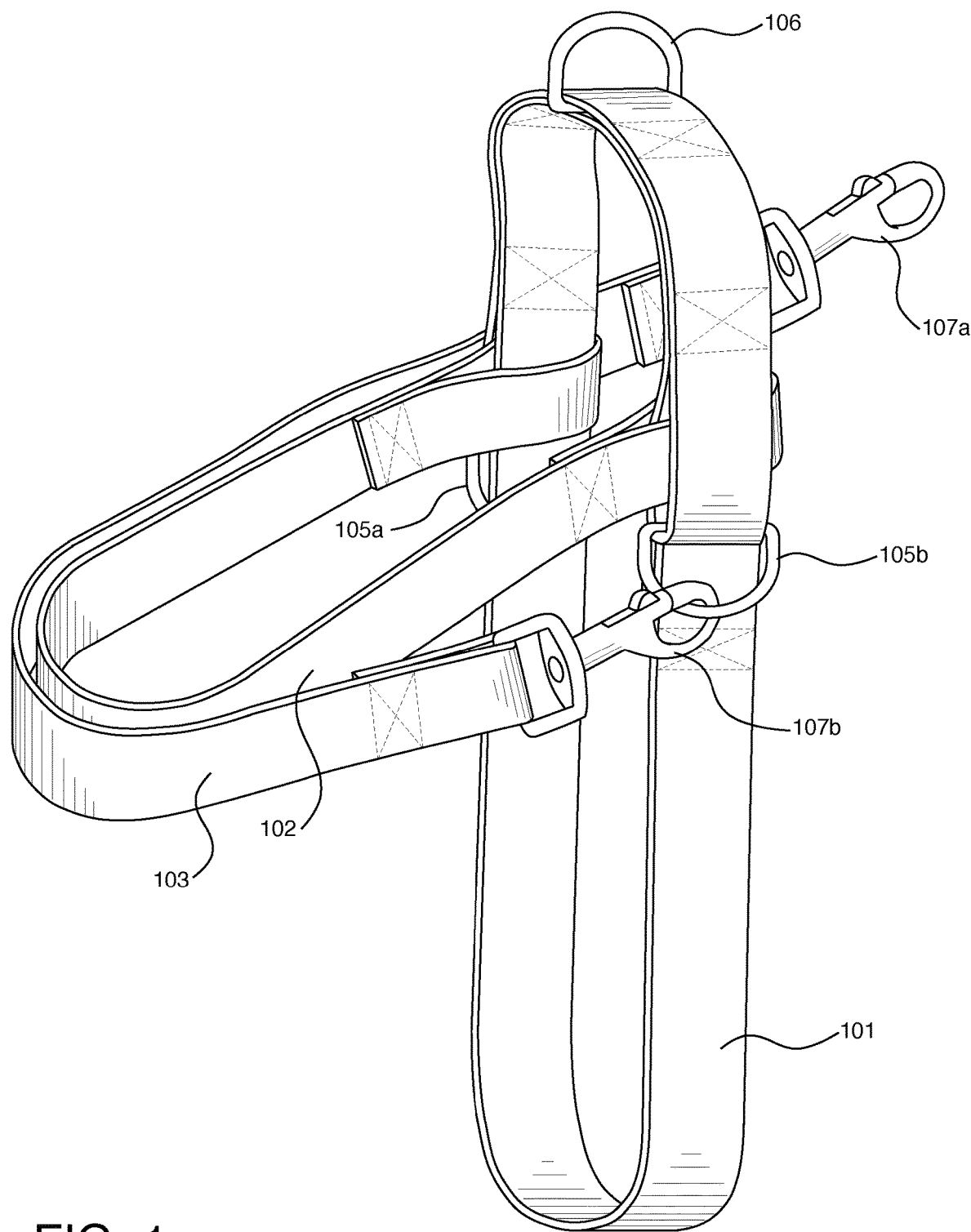
FIGS. 1, 2, and 4 through 9 are perspective views of an animal harness.
Figure 2:
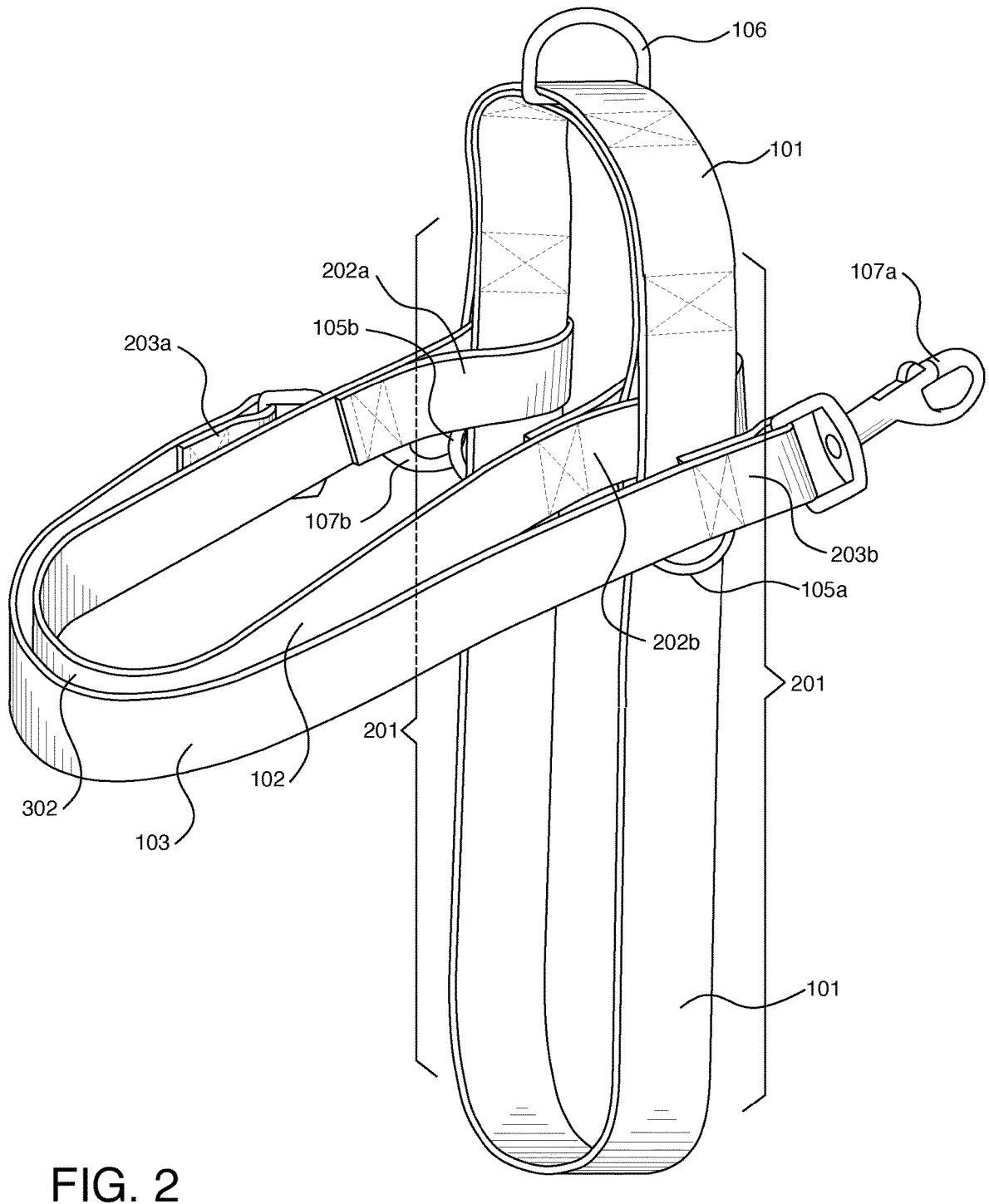
Figure 3:
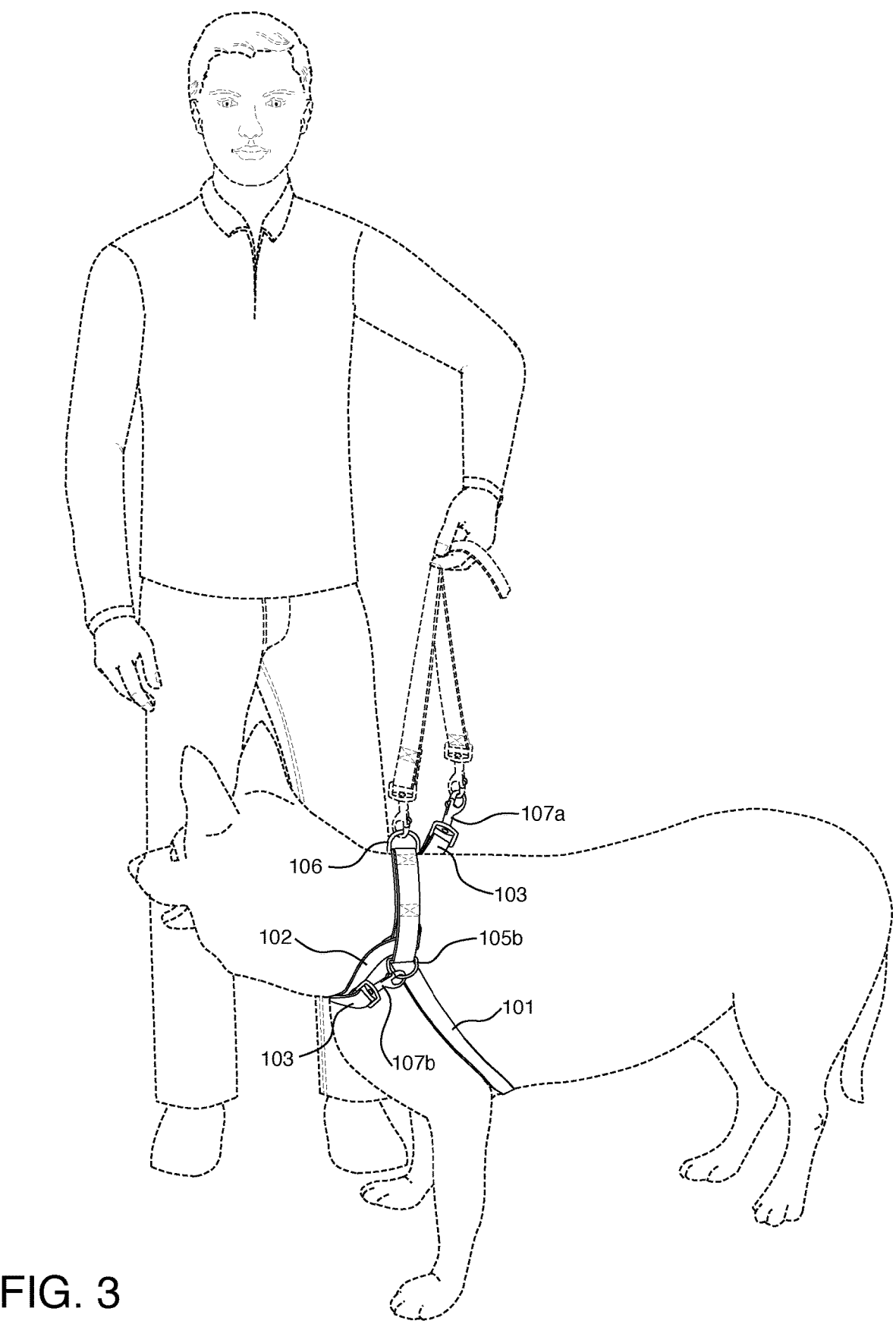
FIG. 3 is a view of an animal harness placed on an animal and coupled to a leash that is controlled by a human.

FIGS. 1 through 9 show an animal harness for handling an animal. An animal harness may comprise a girth strap 101 configured to surround the girth of an animal. The girth of an animal is hereby defined to mean any circumference of an animal's body between the front appendages and the rear appendages. The girth strap 101 may fit snuggly around the girth of an animal as to prevent substantial movement of the girth strap 101 while the animal harness is in use, without causing injury or substantial discomfort to the animal. The girth strap 101 may further comprise a leash attachment point 106. As shown in FIG. 3, the leash attachment point 106 may be located at about the dorsal midpoint of an animal.

An animal harness may further comprise a fixed chest strap 102 configured to be placed across the chest of an animal. The fixed chest strap may further comprise a first end 202a and a second end 202b that each may couple to substantially opposite lateral regions 201 of girth strap 101. The fixed chest strap 102 may fit snuggly across the chest of an animal as to prevent substantial movement of the fixed chest strap 102 while the animal harness is in use, without causing injury or substantial discomfort to the animal. The fixed chest strap 102 may serve the purpose of properly distributing pressure of an animal harness to prevent injury to an animal. The fixed chest strap 102 may also serve the purpose of providing a human with influence over the movement of an animal.

An animal harness may further comprise a first attachment ring 105a and a second attachment ring 105b. The attachment rings 105a, 105b may be at about opposite points in the lateral regions 201 of the girth strap 101. The attachment rings 105a, 105b may serve as attachment points for the releasable connectors 107a, 107b of the free-moving chest strap 103. In some embodiments, the attachment rings 105a, 105b may also serve as the coupling mechanism between the first end 202a and the second end 202b of the fixed chest strap 102 and the lateral regions 201 of the girth strap 101.

An animal harness may further comprise a free-moving chest strap 103 configured to be placed across the chest of an animal. A free moving chest strap 103 may further comprise a first end 203a and a second end 203b. The first end 203a may further comprise a first releasable connector 107a, and the second end 203b may further comprise a second releasable connector 107b. The free-moving chest strap 103 may serve the purpose of allowing a human to influence the lateral movements and center of gravity of an animal. The releasable connectors 107a, 107b may serve the purpose of removably coupling the free-moving chest strap 103 to the animal harness at the attachment rings 105a, 105b.

To instruct an animal to walk on the right side of a human, the first releasable connector 107a may be removably coupled to the first attachment ring 105a, while the second releasable connector 107b may be removably coupled to a leash. To instruct an animal to walk on the left side of a human, the second releasable connector 107b may be removable coupled to the second attachment ring 105b, while the first releasable connector 107a may be removably coupled to a leash.

As shown in FIG. 2, the first releasable connector 107a may be removably coupled to the first attachment ring 105a; however, the first releasable connector 107a, in an alternate configuration, may be removably coupled to the second attachment ring 105b. As shown in FIG. 1, the second releasable connector 107b may be removably coupled to the second attachment ring 105b; however, the second releasable connector 107b, in an alternate configuration, may be removably coupled to the first attachment ring 105a. In an alternate configuration, the first releasable connector 107a may be removably coupled to an attachment ring 105a, 105b while the second releasable connector 107b may also be removably coupled to an attachment ring 105a, 105. In another alternate configuration, the free-moving chest strap 103 may be temporarily uncoupled from an animal harness by uncoupling both releasable connectors 107a, 107b from the attachment rings 105a, 105b.

Figure 4:
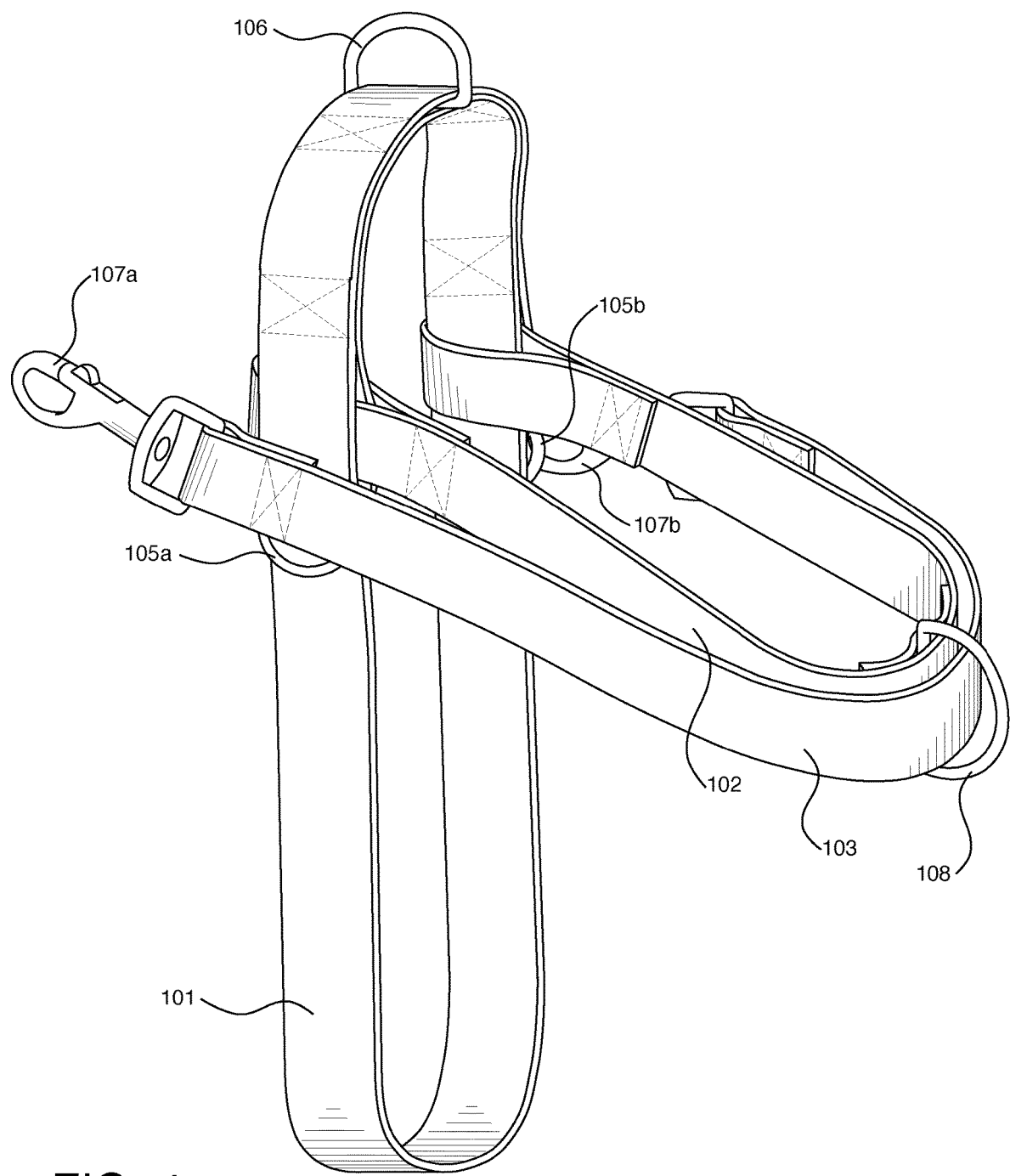

As shown in FIG. 4, the fixed chest strap 102 may further comprise a loop 108 through which the free-moving chest strap 103 may pass. This loop 108 may provide additional stability for the free-moving chest strap 103 when desired by the user.

Figure 5:
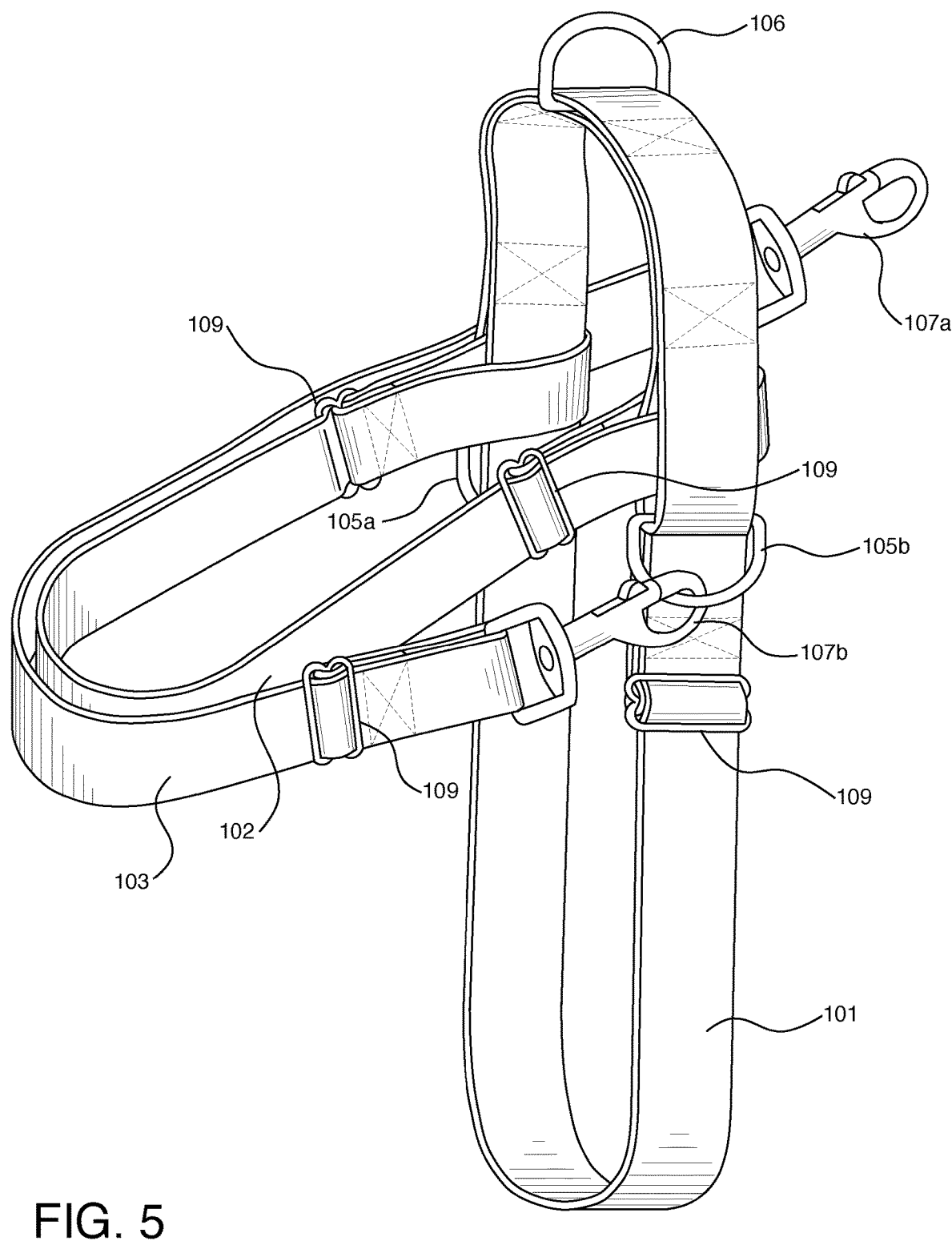

As shown in FIG. 5, at least one of the girth strap 101, the fixed chest strap 102, and the free-moving chest strap 103 may further comprise at least one adjustable slide buckle 109. An adjustable slide buckle 109 may allow for adjustment to the length of a strap 101, 102, 103 to properly fit the animal harness on the animal.

Figure 6:
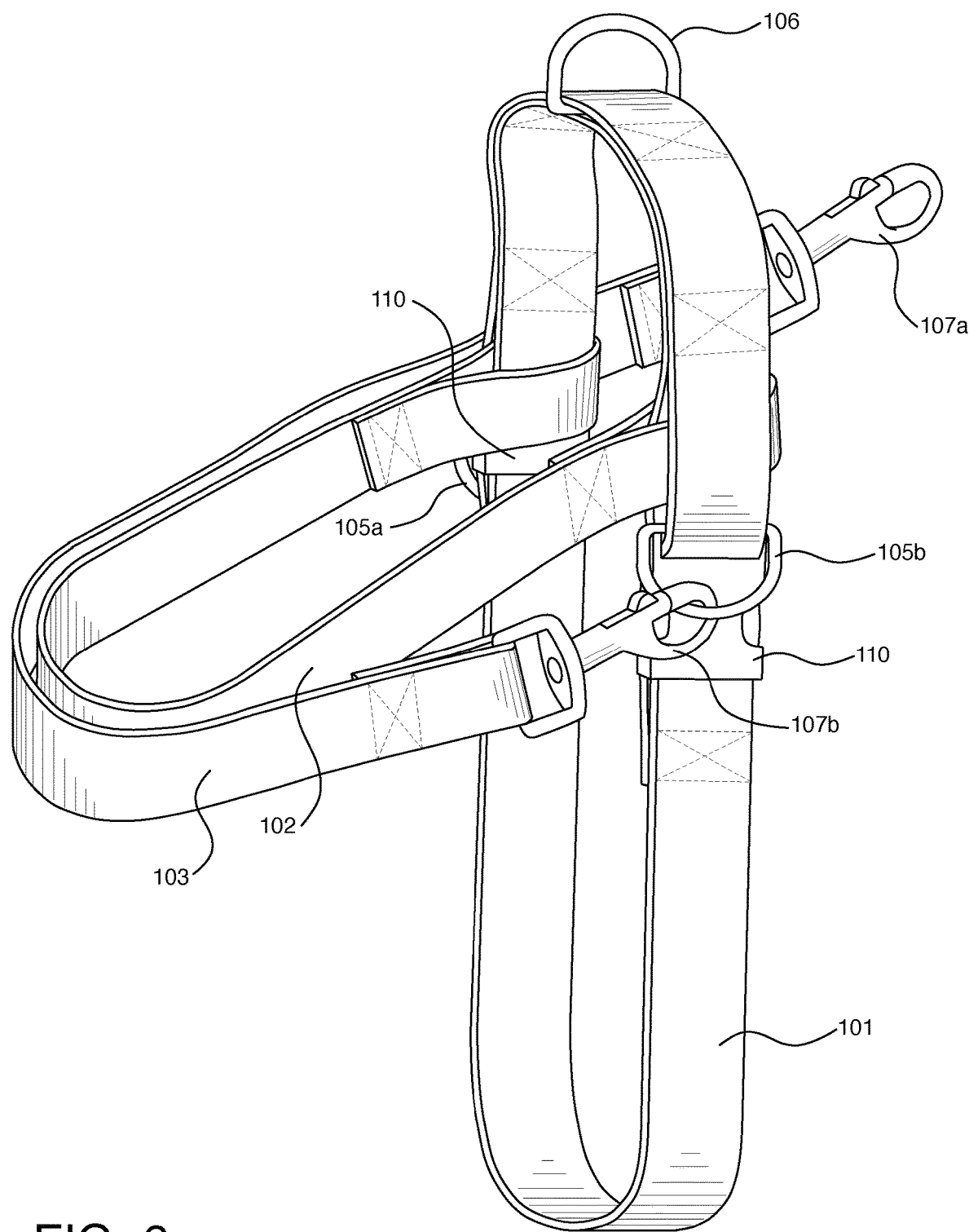
Figure 7:
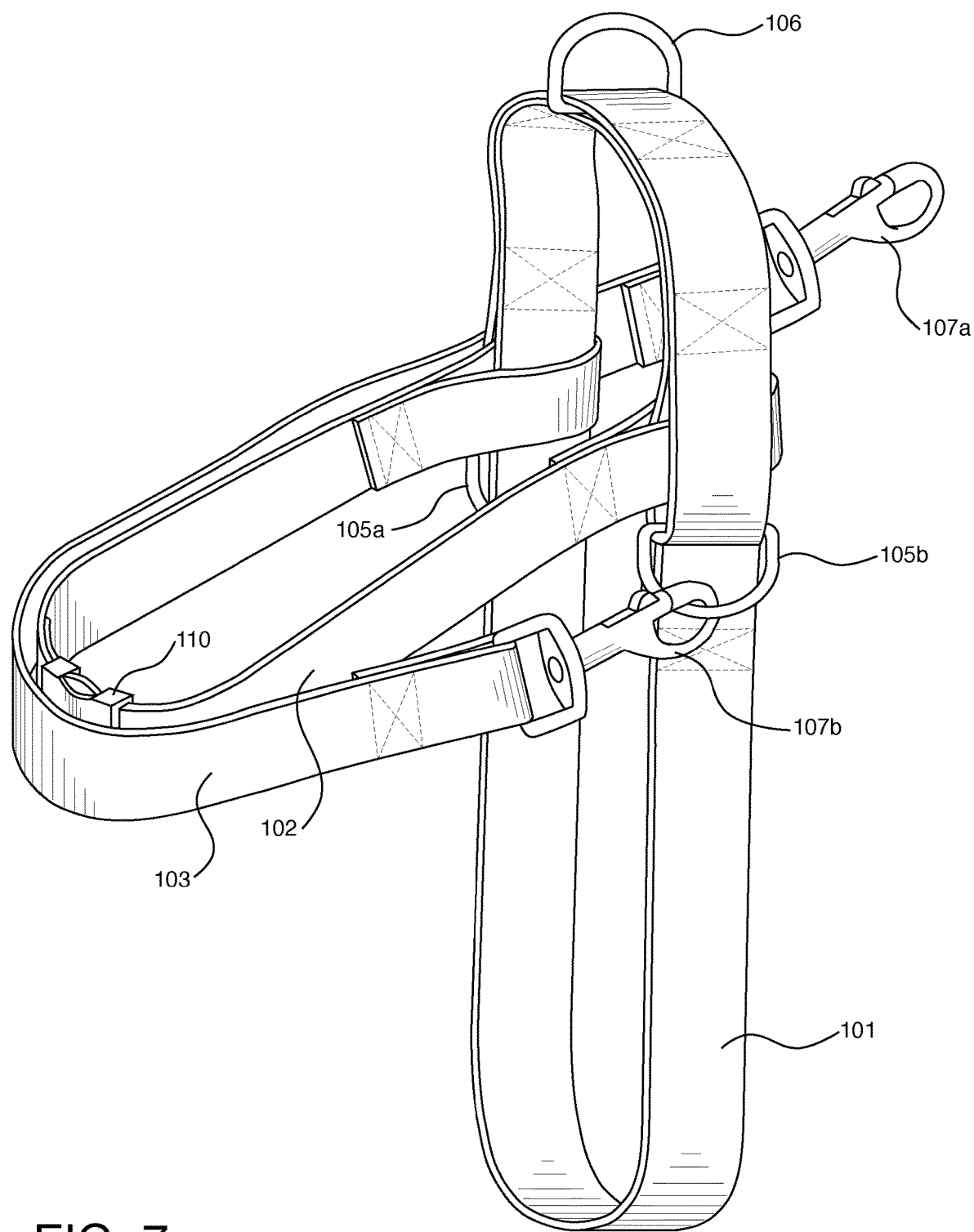

As shown in FIG. 6, a girth strap 101 may further comprise at least one releasable buckle 110. As shown in FIG. 7, the fixed chest strap 102 may further comprise at least one releasable buckle 110. A releasable buckle 110 may allow for an animal harness to be placed around the girth of an animal and/or across the chest of an animal with greater ease.

Figure 8:
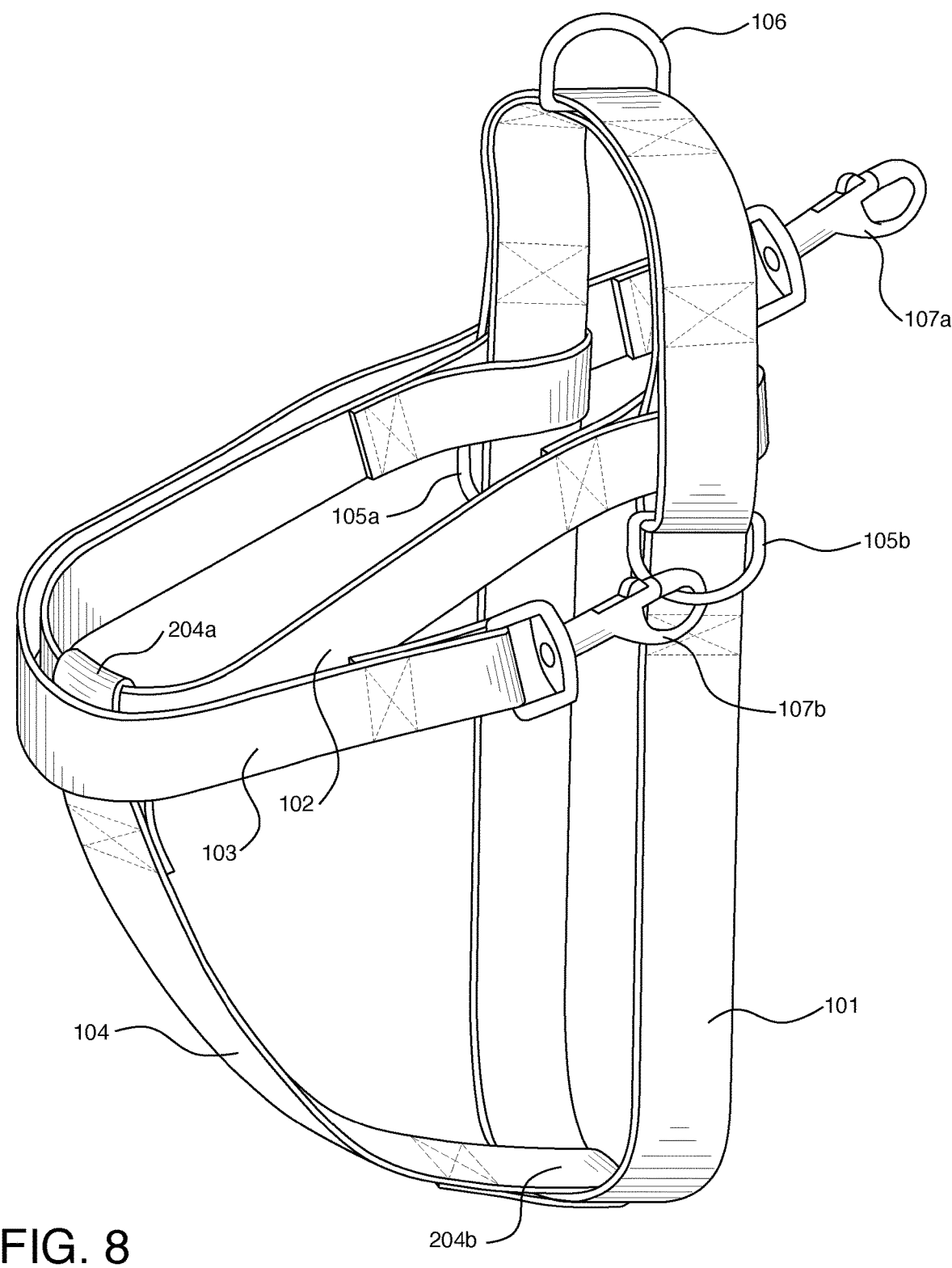
Figure 9:
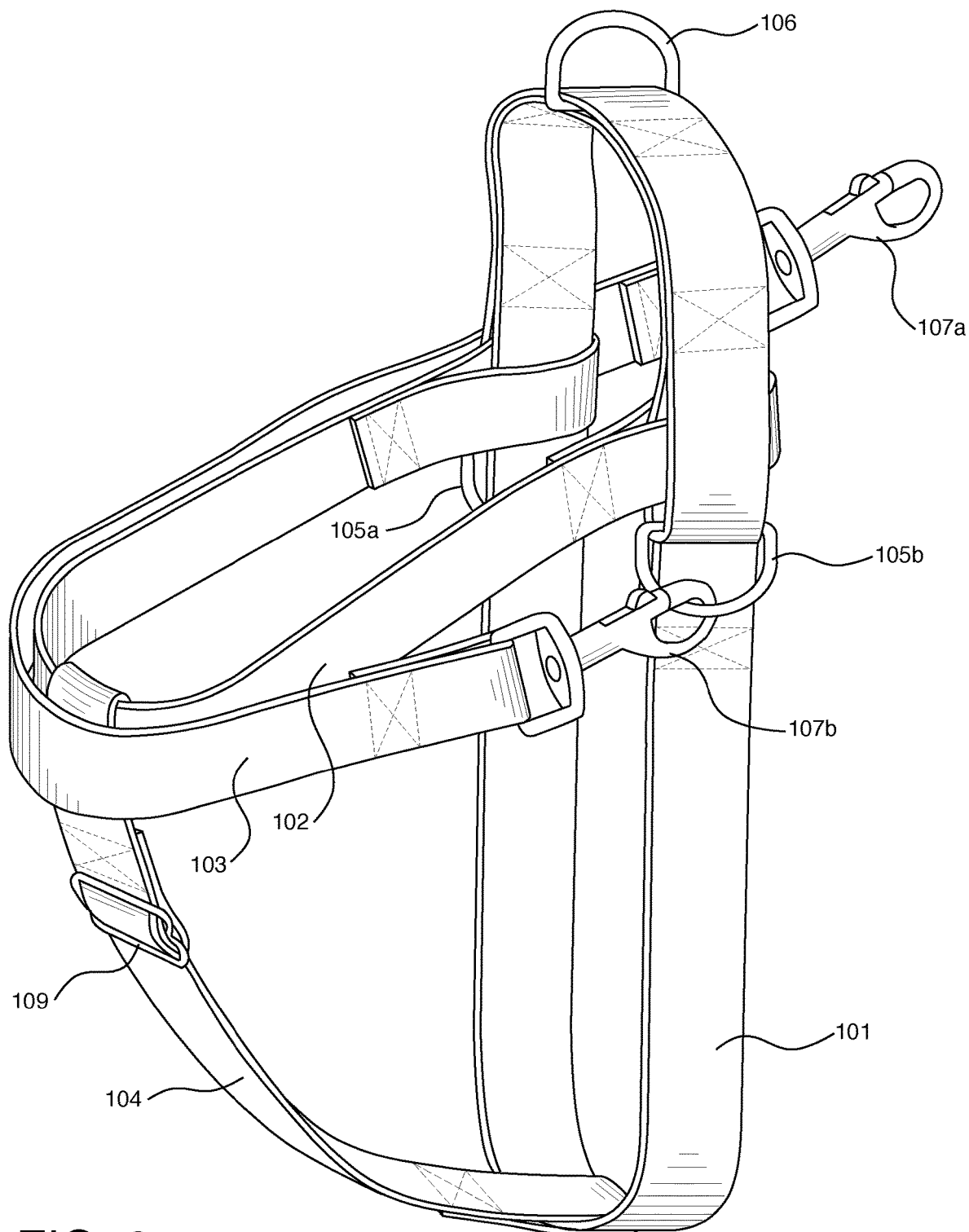

As shown in FIG. 8, an animal harness may further comprise a midline strap 104. A midline strap 104 may further comprise a first end 204a and a second end 204b. The first end 204a of a midline strap 104 may be coupled to the fixed chest strap 102. The second end 204b of a midline strap 104 may be coupled to the girth strap 101. A midline strap 104 may be configured to be placed snuggly across the ventral midline of an animal between the fixed chest strap 102 and the girth strap 101 as to prevent substantial movement of the midline strap 104 while the animal harness is in use, without causing injury or substantial discomfort to the animal. The midline strap 104 may allow for further stability of an animal harness for an animal that may benefit from the increased stability. Needs for increased stability may include anatomical, behavioral, and other needs. As shown in FIG. 9, the midline strap 104 may further comprise at least one adjustable slide buckle 109 to adjust the length of the midline strap 104.

Many of the components of the embodiments described above may be commercially available. Those components that are not commercially available may be manufactured using a variety of materials suitable for their intended purposes, including but not limited to various metals, plastics, and fabrics. Exemplary materials may include metal for the leash attachment point 106, first attachment ring 105a, second attachment ring 105b, first releasable buckle 107a, second releasable buckle 107b, adjustable slide buckle 109, and loop 108, rigid plastic for the releasable buckle 110, and fabric for the straps 101, 102, 103, 104.

Alternatively, the first releasable connector 107a, the second releasable connector 107b, adjustable slide buckle 109, and a releasable buckle 110 may be made of any rigid material including, but not limited to, plastic, wood, and stone. The leash attachment point 106, the first attachment ring 105a, the second attachment ring 105b, and the loop 108 may alternatively be made of any rigid material including, but not limited to, plastic, wood, and stone, or any flexible material including, but not limited to, fabric and plastic. The straps 101, 102, 103, 104 may alternatively be made of any flexible material including, but not limited to plastic.

Inventions pertaining to a device and method for handling an animal are described above. Various changes may be made to the inventions without departing from their scope. The above descriptions of non-limiting, exemplary embodiments are provided for the purpose of illustration only and not limitation, with the invention being defined by the claims and equivalents thereof.

I claim:

1. An animal harness, comprising:
   a girth strap configured to surround a girth of an animal, further comprising a leash attachment point;
   a fixed chest strap configured to be placed across a chest of the animal, further comprising a first end and a second end, wherein the first end and the second end are coupled to substantially opposite lateral regions of the girth strap;
   a first attachment ring and a second attachment ring, wherein the first attachment ring and the second attachment ring are coupled to substantially opposite lateral regions of the girth strap; and
   a free-moving chest strap configured to be placed across the chest of the animal, further comprising:
      a first end, further comprising a releasable connector, wherein the releasable connector is removably coupled to the first attachment ring; and
      a second end, further comprising a releasable connector, wherein the attachment mechanism is removably coupled to the second attachment ring.

2. The animal harness of claim 1, further comprising a midline strap configured to be placed substantially about a ventral midline of the animal, further comprising a first end and a second end, wherein the first end is coupled to the fixed chest strap and the second end is coupled to the girth strap.

3. The animal harness of claim 1, further comprising a loop coupled to the fixed chest strap between the first end and the second end of the fixed chest strap, and wherein the free-moving chest strap passes through the loop of the fixed chest strap.

4. The animal harness of claim 1, wherein the leash attachment is positioned between and substantially equidistance from the lateral regions of the girth strap.

5. The animal harness of claim 1, wherein at least one of the girth strap, the fixed chest strap, and the free-moving chest strap further comprises an adjustable slide buckle.

6. The animal harness of claim 2, wherein the midline strap further comprises an adjustable slide buckle.

7. The animal harness of claim 1, wherein the fixed chest strap further comprises a releasable buckle.

8. The animal harness of claim 1, wherein the girth strap further comprises a releasable buckle.

9. A method for handling an animal, comprising:
   placing a girth strap of an animal harness around a girth of the animal;
   placing a fixed chest strap of the animal harness across a chest of the animal, wherein a first end and a second end of the fixed chest strap are coupled to substantially opposite lateral regions of the girth strap;
   placing a free-moving chest strap of the animal harness across the chest of the animal, wherein the free-moving chest strap further comprise a first releasable connector coupled to an end and a second releasable connector coupled to another end;
   removably coupling the first releasable connector to a first attachment ring; and
   removably coupling the second releasable connector to a second attachment ring.

10. The method of claim 9, further comprising:
    placing a midline strap of the animal harness along a ventral midline of the animal between the fixed chest strap and the girth strap, wherein a first end is coupled to the fixed chest strap at about a midpoint and a second end is coupled to the girth strap;
    placing a front right appendage of the animal through a loop created by the midline strap, the girth strap, and the first end of the fixed chest strap; and
    placing a front left appendage of the animal through a loop created the midline strap, the girth strap, and the second end of the fixed chest strap.

11. The method of claim 9, passing the free-moving chest strap through a loop coupled to the fixed chest strap between the first end and the second end of the fixed chest strap.

12. The method of claim 9, further comprising removably coupling a first end of a leash to the leash attachment point.

13. The method of claim 11, further comprising:
    removably coupling the first end of the leash to the leash attachment point;
    removably coupling the releasable connector of the first end of the free-moving chest strap to the second end of the leash; and
    removably coupling the releasable connector of the second end of the free-moving chest strap to the second attachment ring.

14. The method of claim 11, further comprising:
    removably coupling the first end of the leash to the leash attachment point;
    removably coupling the releasable connector of the second end of the free-moving chest strap to the second end of the leash; and
    removably coupling the releasable connector of the first end of the free-moving chest strap to the first attachment ring.

15. The method of claim 9, further comprising adjusting a length of the girth chest strap using an adjustable slide buckle.

16. The method of claim 9, further comprising adjusting a length of the midline chest strap using an adjustable slide buckle.

17. The method of claim 9, further comprising adjusting a length of the fixed chest strap using an adjustable slide buckle.

18. The method of claim 9, further comprising adjusting a length of the free-moving chest strap using an adjustable slide buckle.

19. The method of claim 9, further comprising:
releasing a releasable buckle of the fixed chest strap; and
re-buckling the releasable buckle of the fixed chest strap.

20. The method of claim 9, further comprising:
releasing a releasable buckle of the girth strap; and
re-buckling the releasable buckle of the girth strap.

\* \* \* \* \*